(12) United States Patent
Fernandez et al.

(10) Patent No.: US 9,661,703 B1
(45) Date of Patent: *May 23, 2017

(54) TUBULAR LIGHT EMITTING DIODE LIGHTING DEVICE HAVING SELECTABLE LIGHT OUTPUT

(71) Applicants: Jose M. Fernandez, Sunrise, FL (US); Gary K. Mart, Coral Springs, FL (US); Jeffrey J. Newman, Coral Springs, FL (US)

(72) Inventors: Jose M. Fernandez, Sunrise, FL (US); Gary K. Mart, Coral Springs, FL (US); Jeffrey J. Newman, Coral Springs, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/073,222

(22) Filed: Mar. 17, 2016

Related U.S. Application Data

(63) Continuation of application No. 14/570,596, filed on Dec. 15, 2014, now Pat. No. 9,341,359.

(51) Int. Cl.
| | | |
|---|---|---|
| *F21V 21/00* | (2006.01) | |
| *H05B 33/08* | (2006.01) | |
| *H05B 37/02* | (2006.01) | |
| *F21K 99/00* | (2016.01) | |
| *F21Y 101/02* | (2006.01) | |
| *F21Y 103/00* | (2016.01) | |

(52) U.S. Cl.
CPC ......... *H05B 33/0815* (2013.01); *F21K 9/175* (2013.01); *H05B 33/083* (2013.01); *H05B 37/0272* (2013.01); *F21Y 2101/02* (2013.01); *F21Y 2103/003* (2013.01)

(58) Field of Classification Search
CPC ............ Y02B 20/386; F21Y 2103/003; F21Y 2103/00
USPC .... 315/200 R, 185 R, 187, 291; 362/217.01, 362/217.1
See application file for complete search history.

(56) References Cited

U.S. PATENT DOCUMENTS

| | | | |
|---|---|---|---|
| 8,282,247 | B2 | 10/2012 | Ivey et al. |
| 8,299,695 | B2 | 10/2012 | Simon et al. |
| 8,324,817 | B2 | 12/2012 | Ivey et al. |
| 8,330,381 | B2 | 12/2012 | Langovsky |
| 8,358,056 | B2 | 1/2013 | Park |
| 8,360,599 | B2 | 1/2013 | Ivey et al. |
| 8,362,710 | B2 | 1/2013 | Langovsky |
| 8,382,327 | B2 | 2/2013 | Timmermans et al. |
| 8,421,366 | B2 | 4/2013 | Palazzolo et al. |
| 8,444,292 | B2 | 5/2013 | Ivey et al. |

(Continued)

*Primary Examiner* — Thuy Vinh Tran
(74) *Attorney, Agent, or Firm* — Patents on Demand P.A.; Brian K. Buchheit; Scott M. Garrett

(57) ABSTRACT

A tubular LED bulb includes a circuit board include an AC to DC conversion circuit that provides an output DC current at one of several selectable levels when provided with an AC power source. The DC current is routed through a plurality of LEDs at the selected DC current level. The AC to DC conversion circuit operates responsive to a selection circuit that allows a user to select a level corresponding to a desired light output level. The AC to DC conversion circuit allows the tubular LED bulb to be mounted in a conventional fluorescent light fixture, including a ballast, without regard to polarity. In some embodiments, the circuit board includes jumper blocks to allow multiple circuit boards to be connected in tandem.

20 Claims, 7 Drawing Sheets

(56) References Cited

U.S. PATENT DOCUMENTS

| | | |
|---|---|---|
| 8,454,193 B2 | 6/2013 | Simon et al. |
| 8,455,600 B2 | 6/2013 | Kim et al. |
| 8,482,212 B1 | 7/2013 | Ivey et al. |
| 8,523,394 B2 | 9/2013 | Simon et al. |
| 8,531,109 B2 | 9/2013 | Visser et al. |
| 8,540,401 B2 | 9/2013 | Simon et al. |
| 8,541,958 B2 | 9/2013 | Simon et al. |
| D691,750 S | 10/2013 | Mackiewicz |
| D692,597 S | 10/2013 | Simon et al. |
| 8,556,452 B2 | 10/2013 | Simon et al. |
| 8,571,716 B2 | 10/2013 | Ivey et al. |
| 8,573,813 B2 | 11/2013 | Ivey et al. |
| 8,596,813 B2 | 12/2013 | Ivey |
| 8,628,216 B2 | 1/2014 | Ivey et al. |
| 8,643,298 B2 | 2/2014 | Palazzolo et al. |
| 8,653,984 B2 | 2/2014 | Ivey et al. |
| 8,664,880 B2 | 3/2014 | Ivey et al. |
| 8,674,626 B2 | 3/2014 | Siemiet et al. |
| 8,678,610 B2 | 3/2014 | Simon et al. |
| 8,807,785 B2 | 8/2014 | Ivey et al. |
| 8,830,080 B2 | 9/2014 | Ivey et al. |
| 8,840,282 B2 | 9/2014 | Simon et al. |
| 8,866,396 B2 | 10/2014 | Timmermans et al. |
| 8,870,412 B1 | 10/2014 | Timmermans et al. |
| 8,870,415 B2 | 10/2014 | Ivey |
| 8,894,430 B2 | 11/2014 | Simon et al. |
| 8,901,823 B2 | 12/2014 | Scapa et al. |
| 8,907,556 B2 | 12/2014 | Park et al. |
| 8,907,557 B2 | 12/2014 | Park et al. |
| 8,919,991 B2 | 12/2014 | Lee et al. |
| 8,928,025 B2 | 1/2015 | Simon et al. |
| 8,946,996 B2 | 2/2015 | Ivey et al. |
| 9,006,990 B1 | 4/2015 | Timmermans et al. |
| 9,006,993 B1 | 4/2015 | Timmermans et al. |
| 9,013,119 B2 | 4/2015 | Simon et al. |
| D732,718 S | 6/2015 | Amrine, Jr. |
| 9,057,493 B2 | 6/2015 | Simon et al. |
| 9,072,171 B2 | 6/2015 | Simon |
| 9,101,026 B2 | 8/2015 | Ivey et al. |
| 9,163,794 B2 | 10/2015 | Simon et al. |
| 9,184,518 B2 | 11/2015 | Ivey et al. |
| 9,222,626 B1 | 12/2015 | Timmermans et al. |
| 9,267,650 B2 | 2/2016 | Simon et al. |
| 9,271,367 B2 | 2/2016 | Ivey et al. |
| 9,285,084 B2 | 3/2016 | Amrine et al. |
| 9,338,853 B2 * | 5/2016 | Guang ................. F21V 23/002 |
| 9,353,939 B2 | 5/2016 | Simon et al. |
| 9,357,600 B2 * | 5/2016 | Tao .................... H05B 33/0803 |
| 2010/0156308 A1 * | 6/2010 | Maehara ............ H05B 33/0815 |
| | | 315/224 |
| 2013/0234600 A1 | 9/2013 | Park et al. |
| 2013/0342116 A1 | 12/2013 | Park et al. |
| 2014/0001970 A1 | 1/2014 | Park et al. |
| 2014/0084793 A1 | 3/2014 | Park et al. |
| 2014/0111112 A1 | 4/2014 | Park et al. |
| 2014/0239827 A1 | 8/2014 | Park et al. |
| 2014/0346963 A1 * | 11/2014 | Kang ................ H05B 33/0818 |
| | | 315/200 R |

\* cited by examiner

TUBULAR LIGHT EMITTING DIODE LIGHTING DEVICE HAVING SELECTABLE LIGHT OUTPUT

CROSS-REFERENCE TO RELATED APPLICATION

This application claims priority to pending application Ser. No. 14/570,596, filed Dec. 15, 2014, entitled "TUBULAR LIGHT EMITTING DIODE LIGHTING DEVICE HAVING SELECTABLE LIGHT OUTPUT". Application Ser. No. 14/570,596 is incorporated herein in its entirety.

FIELD OF THE DISCLOSURE

The present disclosure relates generally to lighting devices used to replace conventional fluorescent lighting tubes, and more particularly to light emitting diode (LED) devices used to replace fluorescent bulbs and which are powered by a standard ballast.

BACKGROUND

Fluorescent light bulbs or tubes are in widespread use and are commonly used in commercial and industrial applications. To operate a fluorescent bulb, a ballast is required that converts standard alternating current (AC) electrical service into an AC power signal at a magnitude and frequency higher than commercial AC service which causes ionization of the gas inside the fluorescent tube. While fluorescent tubes are more efficient than incandescent bulbs, they are not as efficient as LED lighting devices in terms of output light versus input electrical power. Accordingly, there has been interest in developing an LED lighting device as a replacement for fluorescent tubes.

One challenge in developing a replacement for fluorescent tubes is the fact that fluorescent tubes are powered by a ballast. The cost of rewiring a fluorescent lighting fixture to bypass a ballast is prohibitive, therefore it is desirable to make a "drop in" replacement that can be powered by an existing ballast. There are several different types of ballasts (i.e. electronic and magnetic) commonly in use, however, each having different electrical output characteristics for pre-heat (with starter), rapid start, program start, semi-resonant, and instant start type fluorescent bulb types. Accordingly, these output characteristic need to be addressed when designing a power conversion circuit for driving LEDs from the ballast. This has led to the development of different LED replacement tube devices for use with different ballast types due to the small area available inside a tube housing designed to house the LEDs and fit within a standardized fluorescent tube configuration. Conventional LED replacement tube lighting device are designed for a specific type of ballast and are not capable of proper operation with a different type of ballast. In some cases the use of LED replacement tubes involves the removal of the ballast, which can represent a significant cost.

Another issue is that fluorescent bulbs generally operate at one light output level because of their design. A threshold current is necessary to support the continued ionization process that results in light. This means that the variability of light output for a particular bulb is not particularly variable, as it is with an incandescent bulb, for example. To reduce light in a commercial or industrial setting some of the bulbs are simply turned off, leaving enough on to produce the desired lower light level. However, this not a suitable solution in applications where there are only one or a small number of tubes for a smaller space being lit. Even with a small number of tubes, turning one or more off can leave dark spots in an area being lit. In commercial or industrial setting the light fixated are typically mounted higher than in, for example, and office setting. The higher mounting allows light to diffuse over a larger are, so even when some bulbs are turned off, the problem of dark spots is mitigated. Conventional LED replacement lighting tube devices are designed in such a way that they output only one light level. Different models are made to output different light (i.e. lumen output) levels, which requires a manufacturer to design, manufacture, and stock different models for different applications and light output level, as well as by different types of ballasts.

Accordingly, there is a need for a LED lighting device that can be powered by any of the standard ballast types, and which can provide a variable light output level while remaining in the standard tube configuration.

BRIEF DESCRIPTION OF THE FIGURES

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
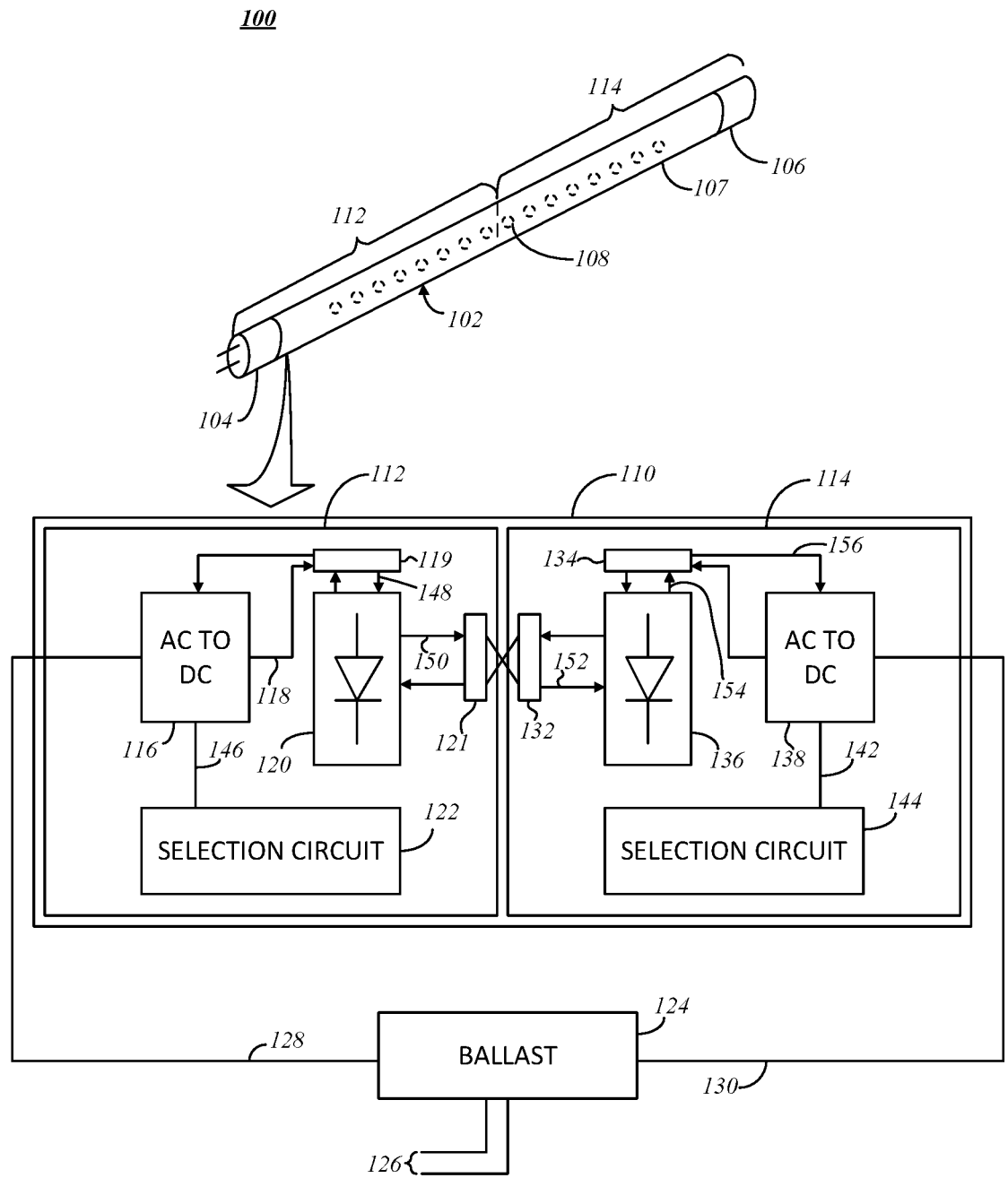
FIG. 1 is tubular light emitting diode (LED) bulb and a block schematic diagram of circuit board arrangement for the tubular LED bulb, in accordance with some embodiments.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

In various embodiments a light emitting diode (LED) device is configured in a tubular form as a replacement for similarly tubular fluorescent bulbs. Some embodiments include a LED assembly configured to be powered by a ballast. The LED assembly can include an alternating current (AC) to direct current (DC) conversion circuit that converts the output of the ballast to a selected DC current level. The LED assembly further includes a plurality of LEDs electrically coupled to the AC to DC conversion circuit and powered by the selected DC current. The LED assembly can further include a selection circuit coupled to the AC to DC conversion circuit which has a plurality of selection states, where each selection state causes the AC to DC conversion circuit to output the selected DC current at a different corresponding level. The LED assembly further includes a tubular housing that entirely conforms to the shape of a standard fluorescent tube, and which houses the AC to DC conversion circuit, plurality of LEDs, and the selection circuit.

FIG. 1 is tubular light emitting diode (LED) bulb 102 and a block schematic diagram of circuit board arrangement for the tubular LED bulb 102, in accordance with some embodiments. The tubular LED bulb 102 includes a plurality of LEDs 108 and can be physically configured to fit into a standardized fluorescent bulb socket that is driven by a fluorescent bulb ballast 124 which is connected to a commercial AC source (e.g. 110 or 220 VAC). Although there are a variety of ballast types deployed in various industrial and commercial applications, the tubular LED bulb 102 is designed such that it will operate with any of the standardized ballast types commonly used in such commercial and industrial applications, and is therefore a replacement option for such deployed systems without requiring separate designs for each different ballast type. Accordingly the tubular LED bulb 102 includes end caps 104, 106 which include electrodes that make electrical contact with electrical connectors in a fluorescent bulb fixture, and which also physically retain fluorescent bulbs and the tubular LED bulb 102. In general the LEDs 108 are arranged in a line along the length of the tubular LED bulb in the tubular housing 107. The tubular housing 107 includes transparent or translucent material through which light from the LEDs pass into the ambient space. In some embodiments the LEDs 108 and circuitry for powering the LEDs 108 can be disposed on a single circuit board housed in the tubular LED bulb 102, and in some embodiments the LEDs 108 can be disposed on multiple circuit boards that are connected in tandem (i.e. electrically in series) along the length of the tubular LED bulb 102. In the present example two circuit boards are connected in tandem. The circuit boards can have identical designs, but are configured differently where one board regulates power and the DC current to drive the LEDs and a second board is configured such that DC current from the first board passes through LEDs on the second board, and portions of the circuitry on the second board can be bypassed as they are not needed. Electricity is provided to the tubular LED bulb 102 from the ballast 124. The power provided by the ballast 124 is processed by circuitry 110 in the tubular LED bulb 102 to power a plurality of LEDs 108. The electrical current passing through the LEDs 108 can be varied or selected by a user in order to control the light output of the tubular LED bulb 102.

The circuitry 110 includes a first circuit board 112 and a second circuit board 114 that can include substantially identical circuitry components, and are connected in a tandem arrangement. As shown here, the electrical block diagrams for boards 112, 114 are shown, and their position in the tubular housing 107 of the tubular LED bulb 102 are indicated. Although the first and second circuit boards 112, 114 may include identical circuitry and components, they are configured differently via the configuration of connections in jumper blocks 119, 121, 132, 134, which use zero Ohm jumpers between selected electrodes to configure paths as illustrated. Alternatively, the jumper blocks 119, 121, 132, 134 can be replaced by switch arrays equivalently. Accordingly, the ballast 124 connects to an input/output of the first circuit board 112 and to a corresponding input/output of the second circuit board 114, wherein, in the present example, a DC current generally flows from left to right, as shown, from the first circuit board 112 to the second circuit board 114. The ballast provides only an AC voltage, and current provided by the ballast can flow in a rectified manner, as will be explained.

Each of the first and second circuit boards 112, 114, include an alternating current (AC) to direct current (DC) block 116, 138, respectively. The AC to DC block 116 on the first circuit board 112 converts the AC power provided by the ballast 124 into a DC current on path 118 through rectification and bulk capacitor filtering, as is well known. The resulting DC current is passed through a first jumper block 119 that is configured to route the DC current through a plurality of LEDs 120, though path 148. As the DC current passes through the LEDs 120 of the first circuit board 112, the DC current passes through a second jumper block 121 via path 150. The second jumper block 121 is connected to a corresponding jumper block 132 on the second circuit board 114 via a suitable electrical connection. The unused paths in or out of jumper blocks 119, 121 are disabled (i.e. disconnected). Jumper block 132 is configured to route the DC current along path 152 into a plurality of LEDs 136 of the second circuit board 114. Jumper block 134 is configured to provide a path 154 for the DC current to exit the plurality of LEDs 136 to the AC to DC converter circuit 138 along path 156. The current entering the AC to DC conversion circuit 138 from path 156 can exit the AC to DC conversion circuit 138 though a rectifier bridge of the AC to DC conversion circuit, as is known. The unused paths of jumper blocks 132, 134 are disconnected. Thus, by appropriate configuration of jumper blocks 119, 121, 132, and 134, the first circuit board 112 can generate a DC current and pass it through the LEDs 120 of the first circuit board 112, and direct the DC current to the second circuit board 114 in such a way that, as facilitated by the configurations of jumper blocks 132, 134, the DC current will also pass through the LEDs 136 of the second circuit board 114, and exit the second circuit board 114 and return on half cycles of the AC signal provided by the ballast 124.

The current regulation is controlled by a selection circuit 122, which can be manually or remotely controlled. The second circuit board 114 can also include a selection circuit 144, which may not be used when the first circuit board 112 is configured to regulate the DC current. The selection circuit 122 determines the amount of DC current output by the AC to DC conversion circuit 116, and allows a user to configure the tubular LED bulb 102 to output a selected light output level. The circuit boards 112, 114 can both include all the necessary circuitry to regulate current through the LEDs using power provided by the ballast 124, but can be configured to either regulate the DC current or simply allow the DC current to pass through it.

The ballast 124 provides an AC signal between a first line 128 and a second line 130, and is powered by a commercial AC source 126. The AC signal provided by the ballast is adapted to drive a standard fluorescent bulb. The ballast can be any one of the known ballast types. Since the signal provided by the ballast 128 is an AC signal, the orientation of the first and second lines 128, 130 does not matter. First line 128 can be the "line" voltage and the second line 130 can be the "common," or vice versa. From the perspective of the first and second circuit boards 112, 114, the orientation of the first and second lines 128, 130 is irrelevant.

Accordingly, the design of circuit boards 112, 114 provide the benefit of being operable with any of the several varieties of presently deployed lighting ballasts that are designed to drive fluorescent bulbs, thereby obviating the need to rewire existing fluorescent bulb fixtures, or design different LED bulb circuits to work with each type of ballast. Although shown here using two circuit boards 112, 114, the second circuit board 114 could be eliminated, and the second line 130 of the ballast could be connected directly to jumper block 121. However, in order to provide the necessary light output, all of the LEDs 136 would have to added to circuit board 112. In some embodiments using two identical, but differently configured boards 112, 114 provides a manufacturing advantage. In designing the layout of the boards 112, 114, the jumper blocks 119, 121, and 132, 134 can be located so as to face an end cap (i.e. 104, 106, respectively) so as to facilitate easy access by removal of an end cap. Once the respective jumper blocks are appropriately configured, the end cap or end caps can be replaced on the tube body 107.

Figure 2:
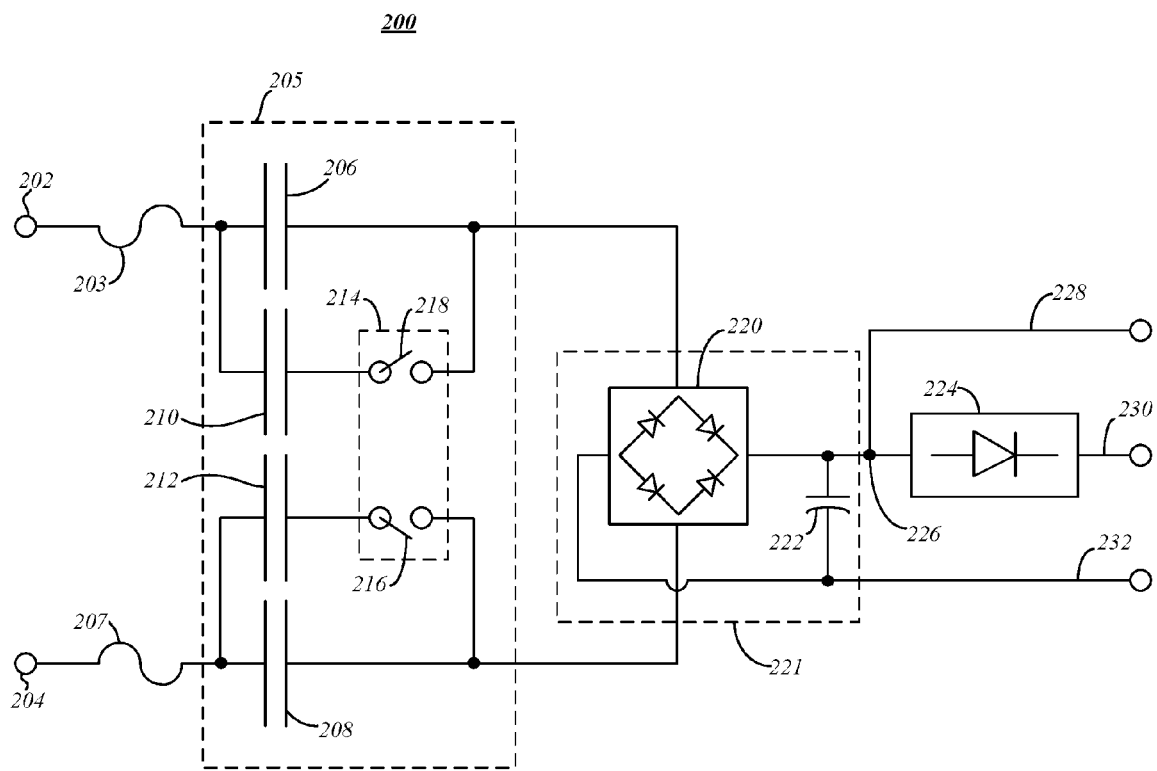
FIG. 2 is a detailed circuit schematic diagram for one board of a tubular LED bulb using two boards connected in a tandem arrangement and using input reactance to control current, in accordance with some embodiments.

FIG. 2 is a detailed circuit schematic diagram for one board 200 of a tubular LED bulb that can use two such boards connected in a tandem arrangement in accordance with that shown in FIG. 1, and using input reactance to control current, in accordance with some embodiments. The circuit board 200 has AC inputs 202, 204 that connect to one line of a ballast (e.g. "line"). Each input 202, 204 can be protected by a respective fuse 203, 207. Input series capacitors 206, 208 present an amount of reactance to the AC signal provided by the ballast, and serve to regulate the current from the ballast to a first level corresponding to the reactance provided by the input series capacitors 206, 208. Additional capacitors 210, 212 are switchably connectable in parallel with input series capacitors 206, 208, respectively, to reduce the series reactance, which allows more current to flow from the ballast when switched in parallel, thus increasing the current from the ballast. Switches 218, 216 are configured in together (i.e. both are open or both are closed) to selectably connect capacitors 210, 212 in parallel with capacitors 206, 208, respectively, to change the current level that is received from the ballast. Switches 216, 218 can be manually operated or remotely operated in a switch block 214, and can be zero Ohm jumpers in some embodiments. The capacitors 206, 208, 210, 212 and switches 216, 218 act as a selection circuit 205 which can be a selection circuit such as selection circuit 122 of FIG. 1. By having two inputs 202, 204, the power from the ballast is split between the inputs, which allows the capacitors 206, 208, 210, 212 to be smaller than if only two capacitors in a single input configuration are used, which facilitates selection of capacitor components to fit inside the tubular housing of the tubular LED bulb. Of course, in some embodiments where power is less a consideration, a single input configuration (i.e. input 202, capacitors 206, 210, and switch 218) can be used without need for the second input 204 and its capacitors.

The AC current passing through the selection circuit 205 is applied to an AC to DC conversion block 221 that can include a full wave rectifier bridge 220 and a bulk filter capacitor 222. Thus, the voltage across the bulk filter capacitor 222 has a substantial DC component, and DC current passes through the plurality of LEDs 224. As the current leaves the LEDs 224 it can be, in some embodiments, directed through a connector 230 into a second board connected in a tandem arrangement.

The connector 230 can connect the output of LEDs 224 (i.e. the current passing through the LEDs 224) to a connector on a tandem-connected board that directs the current to a node that corresponds with node 226 to pass the current through the LEDs on the tandem-connected board in the forward direction. Conversely, if the board 200 is the tandem-connected board, then current will come through connector 228 to node 226, and connector 230 will be connected to ground 232 to allow the current to pass through the rectifier bridge 220 and through the selection circuit 205 to return to the ballast. It will be appreciated by those skilled in the art that circuit board 200 can be used alone, rather than in a tandem configuration with another board, provided a sufficiently number of LEDs 224 can be mounted on the board 200 for a given application. Whether in a tandem configuration or a solo configuration, the orientation with regard to the ballast output is irrelevant, and the board can be connected in either polarity.

Figure 3:
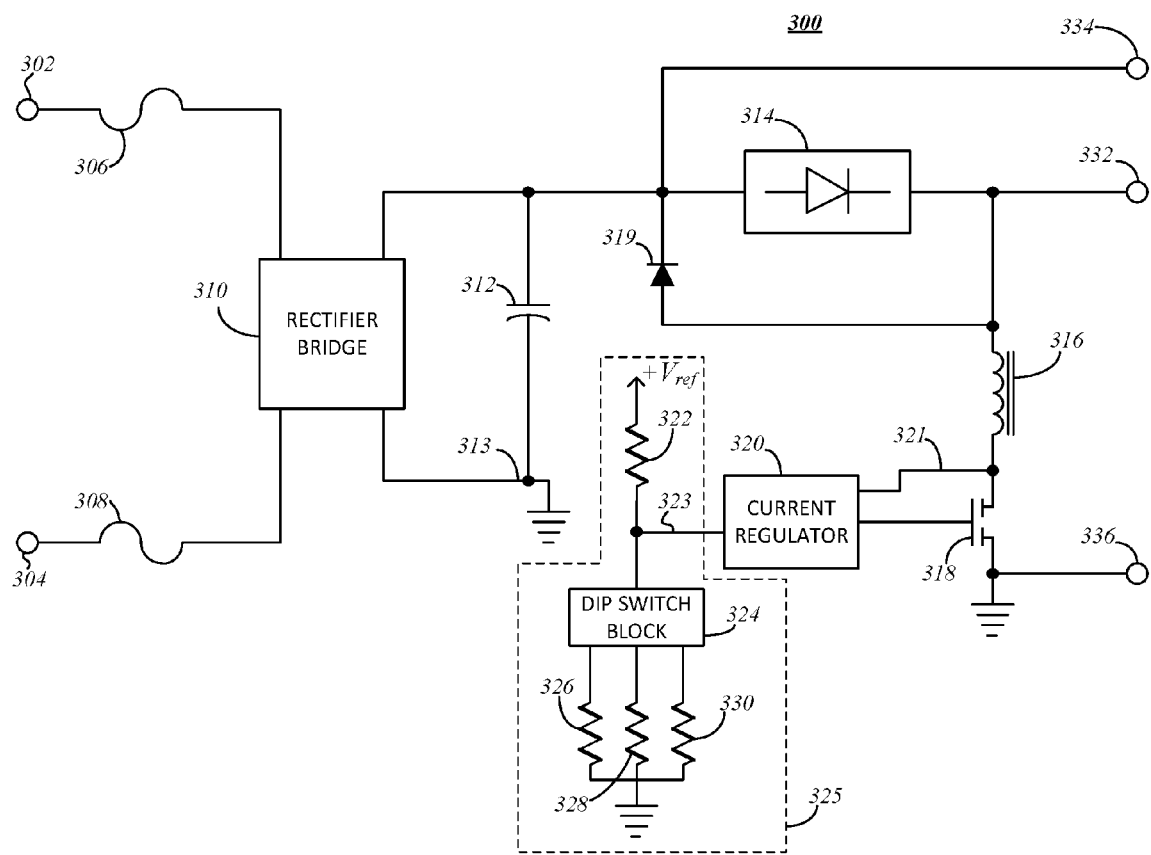
FIG. 3 is a block schematic diagram for one board of a tubular LED bulb using two boards connected in a tandem arrangement and using variable switched current regulation, in accordance with some embodiments.

FIG. 3 is a block schematic diagram for one board 300 of a tubular LED bulb in accordance with some embodiments. In some embodiments the tubular LED bulb can use two or more boards such as board 300 connected in tandem and appropriately configured. The board 300 includes circuitry for variable switched current regulation in powering the LEDs of the tubular LED bulb, and is bi-directional so that it can be mounted in a fluorescent bulb fixture without regard for orientation or the type of ballast providing power to the fluorescent light fixture.

AC voltage from a ballast is provided at AC inputs 302, 304 and passes through fuses 306, 308 that can be used to prevent excessive current through the board 300. Given the configuration of fluorescent light fixtures, the receptacle in which the terminals of the tubular LED bulb are mounted may provide a connection to the ballast at only one of terminals 302, 304, leaving the other terminal unconnected. AC to DC conversion is performed by a full wave bridge rectifier block 310 and a bulk filter capacitor 312 to produce a DC voltage across the bulk filter capacitor 312 with respect to the DC ground 313. DC current from the bulk filter capacitor 312 passes through a plurality of LEDs 314 and is regulated by a switched mode current regulator 320 that switches current through an inductor 316 by operation of a switch 318 (i.e. a transistor) to load the inductor 316 (i.e. energy storage in the magnetic field of the inductor 316). A free wheel diode 319 maintains current flow through the LEDs when the switch 318 is closed and the inductor 316 unloads (i.e. produces current as its magnetic field collapses).

A selection circuit 325 allows a user to adjust the current through the LEDs 314 by adjusting a level of a reference signal 323 used by the switched mode regulator 320 to control current through the LEDs 314. Current can be sensed via line 321 during the on state of switch 318. In some embodiments the reference signal 323 can be controlled by a selectable voltage divider comprised of an upper resistor 322 and two or more lower resistors 326, 328, 330 which divide a reference voltage $V_{ref}$ to produce the reference signal 323. A series of switches in a dual inline package (DIP) switch block 324 are connected in series with each lower resistor 326, 328, 330, respectively, to control whether each resistor 326, 328, 330 is connected in series with the upper resistor 322 to adjust the reference signal 323. The switches in the DIP switch block 324 can be manually switched in some embodiments, or alternatively they can be transistor switches.

As with the embodiments represented in FIG. 2, the DC current through the LEDs 314 can be provided to a tandem-connected board to power the LEDs of the tandem-connected board at the same current level. The output of the LEDs at terminal 332 can be provided to a similar board to board 300. As an example, assume that board 300 is the second board in a tandem-connected arrangement. The current from the output of the LEDs of the first board (e.g. at terminal 332 of the first board) is then provided to terminal 334, and, on the tandem-connected board, terminal 332 and the DC ground at terminal 336 are connected together, resulting in current entering the tandem-connected board at terminal 334, passing through the LEDs 314, and through terminals 332, 336 (which would be configured as shorted together). The current returns to the ballast though the rectifier block 310 and one or both of terminals 302, 204.

Figure 4:
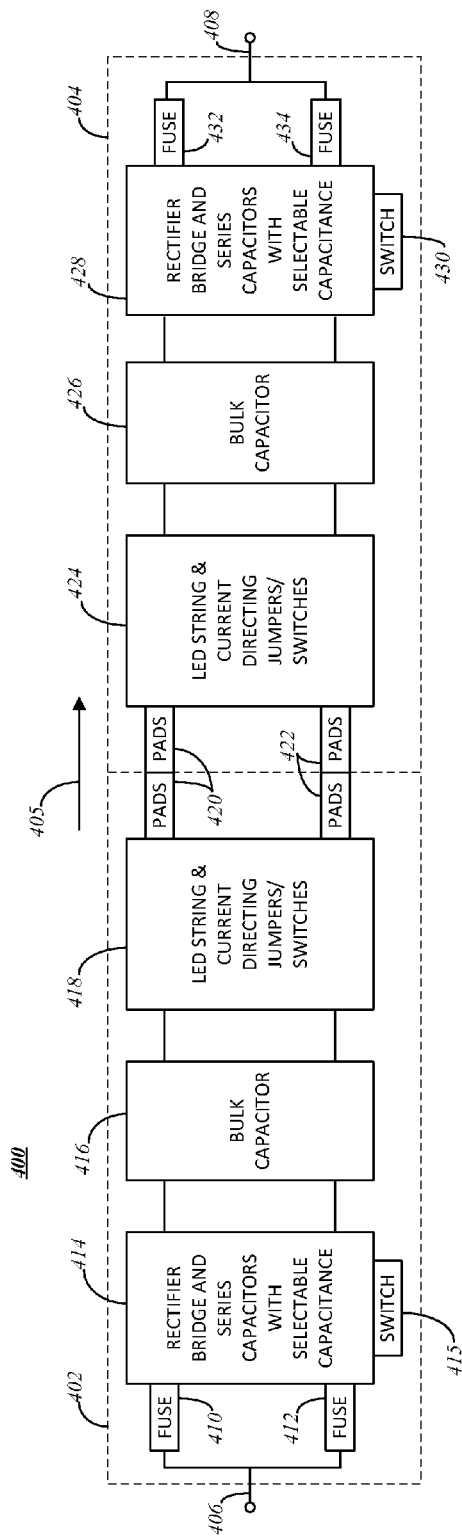
FIG. 4 is a block diagram of a tandem arrangement of two boards for a tubular LED bulb using variable input reactance to control current, in accordance with some embodiments.

FIG. 4 is a block diagram of a tandem arrangement 400 of two boards 402, 404 for a tubular LED bulb using variable input reactance to control current, in accordance with some embodiments. The arrangement 400 can represent two boards configured in accordance with embodiments of FIG. 2 that are connected in a tandem arrangement. Accordingly, there is a first board 402 and second board 404 which can include substantially identical circuitry in some embodiments, and can be connected in a tandem configuration, physically. While the boards 402, 404 can have an identical layout and include identical circuitry components, by use of the jumper blocks (e.g. jumper blocks 119, 121, 132, 134 of FIG. 1), the boards 402, 404 can be configured to have different electrical operation. In general, DC current passes through the boards in the direction of arrow 405. Electrically, the current is steered through connectors into the second board 404 from the first board 402 so that the current goes in the forward direction through the LEDs of the second board 404.

AC power is provided from a ballast that is connected across input/output 406 of the first board 402 and an input/output 408 of the second board 404. Fuses 410, 412 on the first board 402, and fuses 432, 434 of the second board 404 protect against excessive current conditions. A full wave bridge rectifier and capacitor block 414 performs AC to DC conversion, and include input reactance capacitors and switches in accordance with selection circuit 205 of FIG. 2. The second board 404 likewise has an AC to DC conversion block 428 that is substantially the same as AC to DC conversion block 414 of the first board 402. A switch selector 415 adjusts the input reactance of the AC to DC conversion block 414 on the first board 402. A similar arrangement is present on the second board 404 by switch selector 430. Each board 402, 404 uses a bulk filter capacitor 416, 426, respectively. Current is output from the bulk filter capacitor 416 to a string (i.e. series connected) LEDs 418 on the first board 402. Current passing through LEDs 418 is fed, through appropriately configured jumpers or switches or equivalent components, to the second board 404 through connector pads 420, 422 to pass through LEDs 424 on the second board 404. The second board 404 likewise comprises appropriate jumpers or equivalent components to direct the current from the first board 402 through the LEDs 424 in the forward direction. Accordingly, each of the first and second boards 402, 404 comprise components to steer current through its respective group of series connected LEDs, and through its other circuitry such as the AC to DC block, to return to the ballast when connected in a tandem connected configuration such as the second board 404. Since the ballast output is AC across terminals 406, 408, the orientation in which the tubular LED bulb including the tandem arrangement 400 is mounted in the fluorescent lighting fixture is irrelevant.

Figure 5:
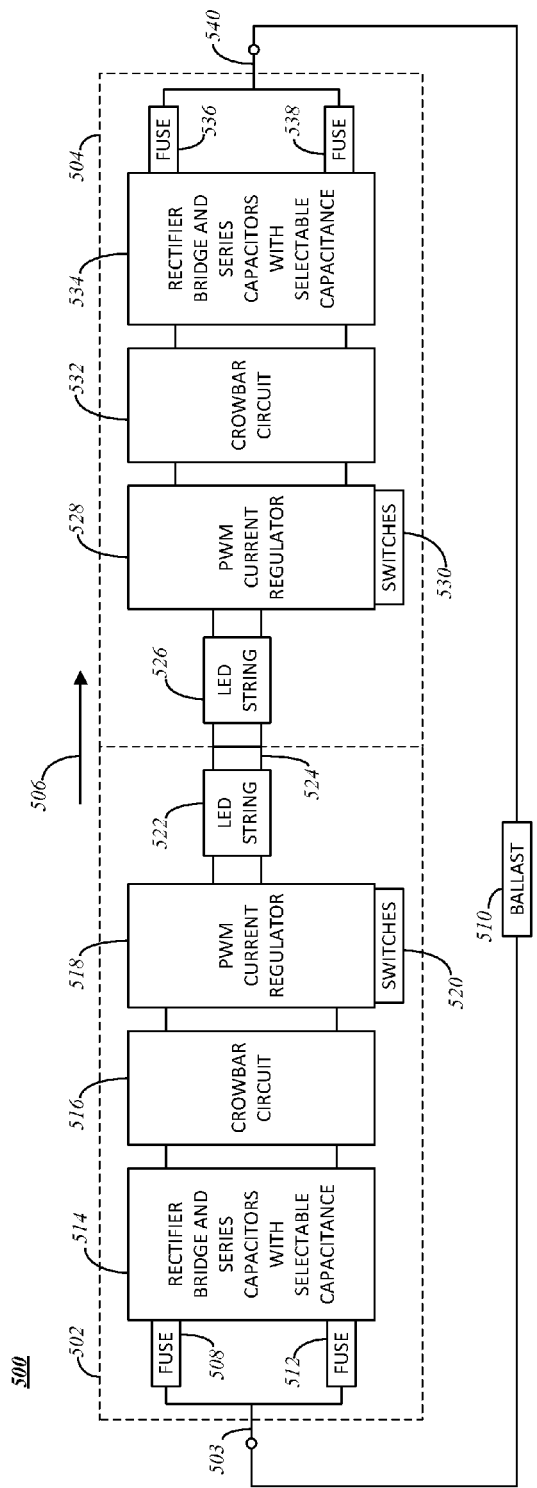
FIG. 5 is a block diagram of a tandem arrangement of two boards for a tubular LED bulb using variable switching current regulation, in accordance with some embodiments.

FIG. 5 is a block diagram of a tandem arrangement 500 of two boards for a tubular LED bulb using variable switching current regulation, in accordance with some embodiments. The arrangement 500 can represent two boards configured in accordance with embodiments of FIG. 3 that are connected in a tandem arrangement, with each board configured electrically appropriate for its position in the tandem arrangement 500. Accordingly, there is a first board 502, and second board 504 which can include identical, but differently configured circuitry, and can be connected in a tandem configuration with board 502. In general, DC current passes through the boards in the direction of arrow 506. Electrically, the current is steered through connectors into the second board 504 from the first board 502 so that the current goes in the forward direction through the LEDs of the second board 504.

Power from a ballast 510 is applied to the input/outputs 503, 540 of the two boards 502, 504, respectively. Fuses 508, 512, 536, 538 prevent excess current from passing through the boards 502, 504. The AC power from the ballast is converted to DC by a full wave bridge rectifier and bulk capacitor block 514. The DC output of block 514 can be regulated by a crowbar circuit 516 to prevent excessive voltage output from block 514. A switched mode current regulator 518 controls and regulates current through LEDs 522. The switched mode regulator 518 is responsive to a input reference controlled, for example, by switches 520, which can adjust a reference level (e.g. reference 323 of FIG. 3) used by the switched mode current regulator 518 so that the current through the LEDs can be varied as desired by a user. The second board 504 likewise contains a plurality of LEDs 526, through which current from the first board 502 is directed by conductors in a connector 524, and appropriate current steering jumpers, switches, or other components on the second board 504. The second board 504 likewise includes a switched mode current regulator 528 that can be controlled by selection switches 530, and can further include a crowbar circuit 532, and a AC to DC conversion block 534. However, when the second board 504 is connected in a tandem arrangement 500 as shown, the first board 502 performs current regulation, and the second board is configured only to steer DC current from the first board through the LEDs 526, and return to the ballast through the rectifier of block 534. Again, since the output of the ballast 510 is applied across terminals 503, 540, the orientation of the boards with respect to the output of the ballast 510 is irrelevant and a tubular LED bulb using the tandem arrangement 500 can be oriented in either direction in a fluorescent light fixture.

Figure 6:
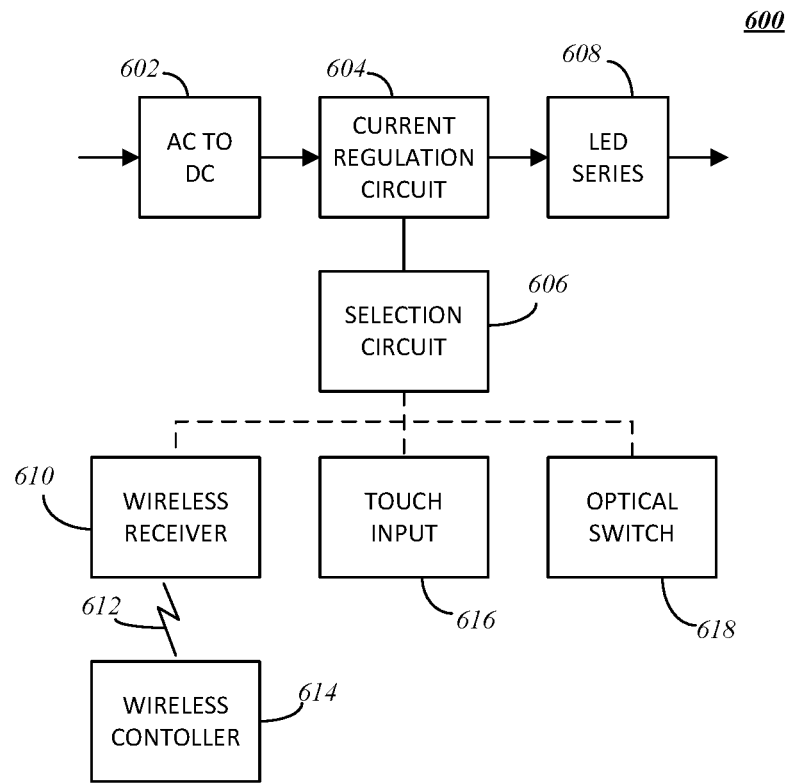
FIG. 6 is a block diagram of a remote controlled circuit for controlling current regulation through a tubular LED bulb, in accordance with some embodiments.

FIG. 6 is a block diagram of a remote controlled circuit 600 for controlling current regulation through a tubular LED bulb, in accordance with some embodiments. The circuit 600 shows one board that can be used alone, or connected in a tandem configuration to form a complete lighting circuit for a tubular LED bulb that can be used to replace fluorescent bulbs, and which will fit into existing fluorescent bulb fixtures that are powered by any of several commonly used ballast types.

An AC to DC block 602 produces DC from the AC power provided by a ballast. The DC current level is regulated by a current regulation block 604, which is variable and can provide different, selectable levels of current. The selected DC current output by the current regulation block 604 is provided to a series of LEDs 608 to produce a level of light output in correspondence with the selected DC current level output. The DC current selection is controlled, for example, by uses of switches 606 that control the current regulation circuit 604. For example, the selection circuit can configure an input series capacitance to select different input reactance in some embodiments. In some embodiments the selection circuit 606 can configure a reference level to a switched mode current regulator, or other such current regulating circuit. The switches 606 are operated responsive to a control circuit. The control circuit can be one of a wireless receiver 610, a touch switch 616, an optical switch 618, or other means of selecting different current levels. Only one of the wireless receiver, touch switch 616, or optical switch 618 need be present, but more than one of them can be present to allow for different modes of control input if desired.

The wireless receiver 610 can operate using radio signals, acoustic signal, or light signals. A remote controller 614 provides a control signal 612 in an appropriate wireless media to cause the wireless receiver 610 to adjust the switches 606 in accordance with the control signal 612 to select the corresponding DC current output level of the current regulator circuit 604 for the desired light output of the LEDs 608. The wireless receiver 610 can be, for example, an infrared receiver in some embodiments. In some embodiments the wireless receiver can be a radio receiver. In particular, the wireless receiver 610 can be configured to operate using known radio networking protocols, such as, for example, those specified by the Institute of Electrical and Electronics Engineers (IEEE) specifications nos. 802.11 or 802.15, which include protocols known commonly as "Wi-Fi," "Bluetooth," and "Zigbee." The touch input 616 can be a sequential switching circuit where a received touch or other tactile input can cycle selection circuit 606 through different adjustment levels corresponding to different DC current, and therefore LED light output, levels. The optical switch 618 can receive light input to cause adjustment of the selection circuit to a desired level.

Figure 7:
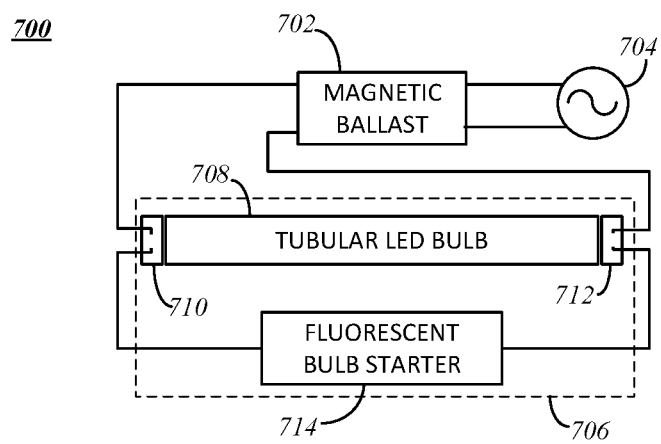
FIG. 7 is a block diagram of a tubular LED lamp device in accordance with some embodiments as used in a first conventional fluorescent lighting fixture.

FIG. 7 is a block diagram of a tubular LED bulb system 700, in accordance with some embodiments, as used in a first conventional fluorescent lighting fixture 706. The fixture 706 includes electrodes 710, 712, between which a tubular bulb is installed. The fixture 706 can be designed to accept a standardized fluorescent bulb between electrodes 710, 712. A tubular LED bulb 708 can be mounted in the fixture between electrodes 710, 712, where the tubular LED bulb 708 can be designed in accordance with embodiments exemplified in FIGS. 1-6. The particular fixture 706 is powered by a magnetic ballast which operates in conjunction with a fluorescent bulb starter 714 in the lighting fixture 706. In a conventional fluorescent bulb, the electrodes 710 connect to filaments in the fluorescent bulb. To start a fluorescent bulb, the filaments are heated by the AC current passing through them and then through the starter 714, causing ionization inside the fluorescent bulb until the bulb turns on. Upon turning on, electrodes in the fluorescent bulb electrically open, thereby disconnecting from the starter 714. The tubular LED bulb 708, however, does not require heating up, and can be an "instant on" bulb. The output of the magnetic ballast 702 is generally at the same frequency as the commercial AC service 704 used to power the magnetic ballast 702, but the magnetic ballast, though a magnetic transformer, adjusts the voltage level. Accordingly, the tubular LED bulb 708 is designed to operate at the voltage level output form the magnetic ballast 702. Once the magnetic ballast 702 is turned on, the tubular LED bulb comes on as well, at the selected light output level.

A modern alternative to the magnetic ballast is an electronic ballast. Electronic ballasts produce an AC voltage that is substantially higher than that of commercial AC service, and can sense when a fluorescent lamp ignites (and experiences a resistive drop in load), and control current accordingly. The tubular LED bulb 708 does not produce a resistance drop. Therefore the design of the tubular LED bulb allows it to operate in fixtures both with electronic and magnetic ballasts, and with and without external starters.

Figure 8:
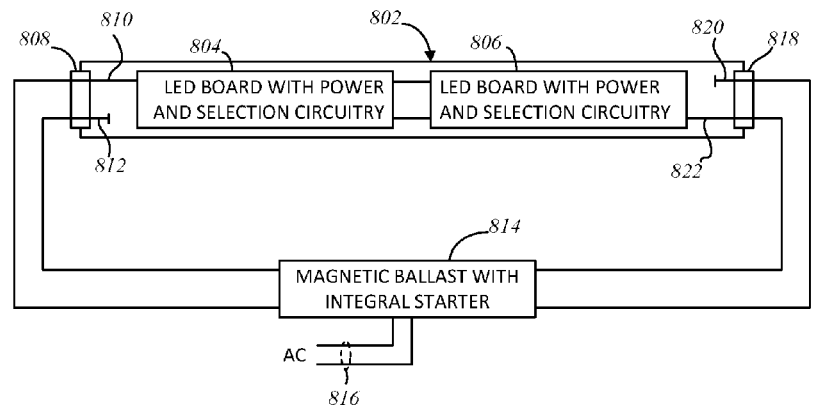
FIG. 8 is a block diagram of a tubular LED lamp device in accordance with some embodiments as used in a second conventional fluorescent lighting fixture.

FIG. 8 is a block diagram of a tubular LED bulb 802, in accordance with some embodiments, as used in a second conventional fluorescent lighting fixture. In some conventional fluorescent bulb fixtures, the bulb starter can be incorporated into the magnetic ballast 814. The ballast 814 is powered by a commercial AC service 816, and provides an AC voltage to electrodes 808, 818, in which the tubule LED bulb 802 is mounted. In some fixtures the electrodes 808, 818 are polar, meaning that have two sides that are each wired to a different polarity of the AC output of the ballast 814. However, the tubular LED bulb only connects to one side each electrode 808, 818, at 810, 820, respectively. The other sides 812, 822 of the electrodes 808, 818 are unterminated or unconnected. Inside the tubular LED bulb 802 there can be a first board 804 and a second board 806 that is connected in tandem with the first board 804, as exemplified by embodiments such as those illustrated in FIGS. 1-6. Thus, the tubular LED bulb 802 has a selectable light output and can be placed in the fluorescent light fixture without regard for orientation.

Figure 9:
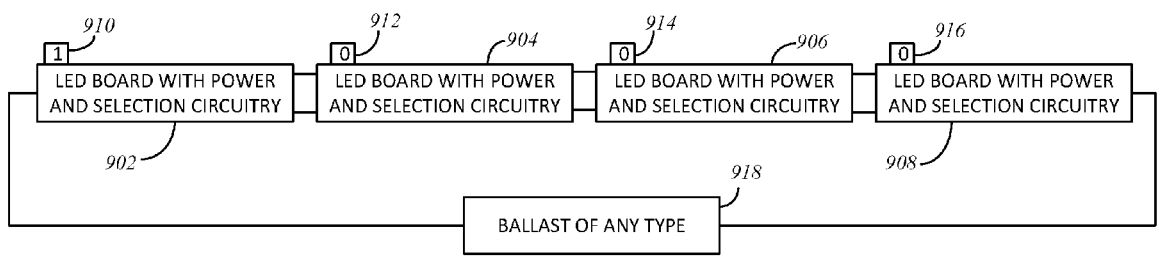
FIG. 9 is a block diagram of a tubular LED land device using more than two LED circuit board assemblies in tandem to achieve a desired overall length corresponding to a standardized length in accordance with some embodiments.

FIG. 9 is a block diagram of a tubular LED bulb 900 using more than two LED circuit board assemblies in tandem to achieve a desired overall length corresponding to a standardized length in accordance with some embodiments. Fluorescent bulbs are standardized in both 4 foot and 8 foot lengths, among other standardized lengths. It is contemplated that a circuit board can be designed to include all the necessary circuitry to operate as a "stand alone" board, but also such that it can be configured to operate in a tandem configuration where some of the circuitry is essentially disabled an unnecessary while configured to operate in a tandem configuration. As such, in a 4 foot tubular LED bulb two boards can be used that connected in a tandem configuration. For an 8 foot bulb configuration, then, a tubular LED bulb can use 4 such boards. Accordingly, the tubular LED bulb 900 includes a first board 902, a second board 904, a third board 906, and a fourth board 908. The first board is configured to regulate current, as indicated by the "1" configuration state 910. The other boards 904, 906, 908 all have a ")" configuration state 912, 914, 916, respectively indicating that these boards 904, 906, 908 are configured to receive current and steer the current through their respective LEDs, but they are not converting the AC voltage provided by the ballast 918 into the DC current (which is performed by the first board 902). The boards 904, 906, and 908 can be connected, for example, the way board 114 of FIG. 1 is configured.

Figure 10:
FIG. 10 is a tubular LED lamp device designed in accordance with some embodiments showing that the LED lamp device can be installed without regard to orientation in a conventional fluorescent lighting fixture.
Figure 10:
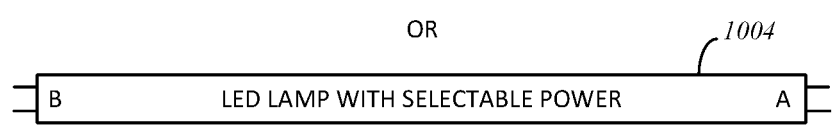
Figure 10:
Figure 10:
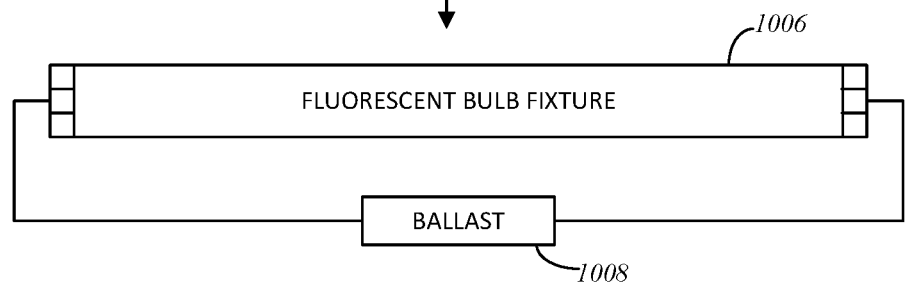

FIG. 10 is a tubular LED bulb 1000 designed in accordance with some embodiments showing that the LED bulb 1000 can be installed without regard to orientation in a conventional fluorescent lighting fixture. The bulb 1000 is shown in two different orientations. In a first orientation 1002 the "A" side is on the left and the "B" side is on the right. In the second orientation 1004, the bulb 1000 is oriented in the reverse of the first orientation. The bulb 1000 can be placed into the fluorescent light fixture 1006 in either the first orientation 1002 or the second orientation 1004, and it will function the same while powered by the ballast 1008.

Embodiments in accordance with the disclosure therefore provide the benefits of being able to be powered by any of the several types of ballasts commonly employed in fluorescent lighting fixtures, as well as having selectable light output, and also using a single board design that can be connected in a tandem configuration, which avoids the necessity of designing different boards for different fixture types.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

We claim:

1. A variable output light emitting diode (LED) assembly configured to be powered by a ballast, comprising:
   an alternating current (AC) to direct current (DC) conversion circuit configured to convert the output of the ballast to a selected DC current level;
   a plurality of LEDs electrically coupled to the AC to DC conversion circuit and powered by the selected DC current;
   a selection circuit coupled to the AC to DC conversion circuit that produces the selected DC current level, and that has a plurality of selection settings, where each selection setting corresponds to a respective one of several DC current levels that can be selected as the selected DC current level; and
   a tubular housing that entirely conforms to the shape of a standard fluorescent tube, and which houses the AC to DC conversion circuit, plurality of LEDs, and the selection circuit.

2. The variable output LED assembly of claim 1, wherein the AC to DC conversion circuit comprises a series input capacitance, the selection circuit comprises a switch that changes a magnitude of the series input capacitance and an AC current that passes through the series input capacitance in proportion to the magnitude of the series capacitance, and wherein the AC current that passes through the series capacitance is converted to the selected DC current by the AC to DC conversion circuit.

3. The variable output LED assembly of claim 2, wherein the series input capacitance comprises:
   a first capacitor in series between a first end cap electrode of the variable output LED assembly and the AC to DC conversion circuit;
   a second capacitor that is coupled in series with a first switch, and wherein the second capacitor and first switch are further coupled in parallel with the first capacitor;
   a third capacitor in series between a second end cap electrode of the variable output LED assembly and the AC to DC conversion circuit; and
   a fourth capacitor that is coupled in series with a second switch, and wherein the fourth capacitor and second switch are further coupled in parallel with the first capacitor;
   wherein the first and second end cap electrodes are AC input electrodes of a common end cap.

4. The variable output LED assembly of claim 1, wherein the AC to DC conversion circuit allows the variable output LED assembly to be installed in fluorescent lamp fixture without regard to polarity.

5. The variable output LED assembly of claim 1, wherein the AC to DC conversion circuit allows the variable output LED assembly to be installed in both fluorescent lamp fixtures that include a starter and fluorescent lamp fixtures that do not include a starter.

6. The variable output LED assembly of claim 1, wherein the selection circuit is manually operated.

7. The variable output LED assembly of claim 1, wherein the selection circuit is remotely operated.

8. The variable output LED assembly of claim 7, further comprising a radio circuit that controls the selection circuit based on a received radio signal.

9. The variable output LED assembly of claim 8, wherein the radio circuit is a wireless network interface circuit.

10. The variable output LED assembly of claim 1, wherein the plurality of LEDs is divided between a first board and a second board, wherein the first and second boards are electrically connected in series between end cap electrodes of the tubular housing, and wherein the first and second boards are configured such that the variable output LED assembly can be placed into a fluorescent light fixture without regard for orientation of the of the variable output LED assembly between electrodes of the fluorescent light fixture.

11. A tubular light emitting diode (LED) bulb for operation in a standard fluorescent lighting fixture, comprising:
   a first circuit board and a second circuit board connected in tandem with the first circuit board, each of the first and second circuit boards including a plurality of LEDs;
   a tubular housing in which the first and second circuit boards are disposed; and
   at least one circuit board including an alternating current (AC) to direct current (DC) conversion circuit configured to convert an AC output of a ballast connected to the standard fluorescent lighting fixture to a selected DC current level, and a selection circuit coupled to the AC to DC conversion circuit having a plurality of selection states, wherein each selection state changes a level of AC provided to the AC to DC conversion circuit from an AC source provided to the tubular LED bulb and in response to output a DC current at the selected level in correspondence with the selection state of the selection circuit;
   wherein the at least one circuit board is configured to provide the selected DC current to the plurality of LEDs of the at least one circuit board.

12. The tubular LED bulb of claim 11, wherein the at least one circuit board comprises a first circuit board and a second circuit board, wherein the first and second circuit boards are identical in layout and components and include jumper blocks to configure each circuit board, wherein the first circuit board is configured to provide the selected DC current from the AC output of the ballast, and the second circuit board is configured to receive the selected DC current from the first circuit board and provide a return to the ballast.

13. The tubular LED bulb of claim 11, wherein the AC to DC conversion circuit comprises a series input capacitance, the selection circuit comprises a switch that changes a magnitude of the series input capacitance and an AC current that passes through the series input capacitance in proportion to the magnitude of the series capacitance, and wherein the AC current that passes through the series capacitance is converted to the selected DC current by the AC to DC conversion circuit.

14. The tubular LED bulb of claim 13, wherein the series input capacitance comprises:
   a first capacitor in series between a first end cap electrode of the variable output LED assembly and the AC to DC conversion circuit;
   a second capacitor that is coupled in series with a first switch, and wherein the second capacitor and first switch are further coupled in parallel with the first capacitor;
   a third capacitor in series between a second end cap electrode of the variable output LED assembly and the AC to DC conversion circuit; and
   a fourth capacitor that is coupled in series with a second switch, and wherein the fourth capacitor and second switch are further coupled in parallel with the first capacitor;
   wherein the first and second end cap electrodes are AC input electrodes of a common end cap.

15. The tubular LED bulb of claim 11, wherein the AC to DC conversion circuit allows the tubular LED bulb to be installed in the standard fluorescent lighting fixture without regard to polarity.

16. The tubular LED bulb of claim 11, wherein the AC to DC conversion circuit allows the tubular LED bulb to be installed in a standard fluorescent lighting fixture that include a starter and a standard fluorescent lighting fixture that do not include a starter.

17. The tubular LED bulb of claim 16, further comprising a radio circuit that controls the selection circuit based on a received radio signal.

18. The tubular LED bulb of claim 11, wherein the selection circuit is remotely operated.

19. A tubular light emitting diode (LED) bulb, comprising:
   a selectable input series capacitance coupled to first and second input electrodes of the tubular LED bulb that is configured to operate as a selectable input impedance to an input alternating current (AC) provided by an AC source to the tubular LED bulb;
   a selection circuit having a plurality of selection settings where each selection setting selects a different capacitance value of the selectable input series capacitance, wherein each different capacitance value corresponds to a respective one of several AC levels that is output from the selectable input series capacitance to an AC to DC conversion circuit, wherein the AC to DC conversion circuit is configured to output a direct current (DC) level in correspondence to the selected AC level output by the series input capacitance; and a plurality of LEDs that are powered by a DC current at a level corresponding to one of the several DC levels.

20. The tubular LED bulb of claim 19, wherein the series input capacitance comprises:

a first capacitor in series between a first end cap electrode of the variable output LED assembly and the AC to DC conversion circuit;

a second capacitor that is coupled in series with a first switch, and wherein the second capacitor and first switch are further coupled in parallel with the first capacitor;

a third capacitor in series between a second end cap electrode of the variable output LED assembly and the AC to DC conversion circuit; and a fourth capacitor that is coupled in series with a second switch, and wherein the fourth capacitor and second switch are further coupled in parallel with the first capacitor;

wherein the first and second end cap electrodes are AC input electrodes of a common end cap.

\* \* \* \* \*